(12) United States Patent
Davis et al.

(10) Patent No.: US 7,177,313 B2
(45) Date of Patent: Feb. 13, 2007

(54) METHOD AND SYSTEM FOR CONVERTING RANGES INTO OVERLAPPING PREFIXES FOR A LONGEST PREFIX MATCH

(75) Inventors: Gordon T. Davis, Chapel Hill, NC (US); Clark D. Jeffries, Durham, NC (US); Jan Van Lunteren, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 10/155,566

(22) Filed: May 23, 2002

(65) Prior Publication Data

US 2003/0219017 A1 Nov. 27, 2003

(51) Int. Cl.
*H04L 12/28* (2006.01)
(52) U.S. Cl. .................. 370/395.42; 370/392; 370/444
(58) Field of Classification Search ................ 370/352, 370/353, 354, 389, 392, 395.21, 395.42, 370/395.43; 709/238, 240
See application file for complete search history.

(56) References Cited

U.S. PATENT DOCUMENTS

| | | | |
|---|---|---|---|
| 5,983,223 A | 11/1999 | Perlman | |
| 5,990,812 A | 11/1999 | Bakhmutsky | |
| 6,011,795 A | 1/2000 | Varghese et al. | |
| 6,052,683 A | 4/2000 | Irwin | |
| 6,157,955 A * | 12/2000 | Narad et al. ................. | 709/228 |
| 6,185,554 B1 | 2/2001 | Bennett | |
| 6,212,184 B1 | 4/2001 | Venkatachary et al. | |
| 6,223,172 B1 | 4/2001 | Hunter et al. | |
| 6,226,710 B1 | 5/2001 | Melchior | |
| 6,237,061 B1 | 5/2001 | Srinivasan et al. | |
| 6,243,720 B1 | 6/2001 | Munter et al. | |
| 6,246,347 B1 | 6/2001 | Bakhmutsky | |
| 6,289,013 B1 * | 9/2001 | Lakshman et al. .......... | 370/389 |
| 6,341,130 B1 * | 1/2002 | Lakshman et al. .......... | 370/389 |
| 6,496,515 B2 * | 12/2002 | Lefebvre et al. ............ | 370/455 |
| 6,778,530 B1 * | 8/2004 | Greene ....................... | 370/389 |
| 6,961,781 B1 * | 11/2005 | Mukherjee et al. ......... | 709/240 |
| 2002/0010783 A1 * | 1/2002 | Primak et al. .............. | 709/228 |
| 2002/0191605 A1 * | 12/2002 | Lunteren et al. ............ | 370/389 |

OTHER PUBLICATIONS

Feldmann, Anja et al., "Tradeoffs for Packet Classification," AT&T Lab-Research, pp. 1-10.
Iyer, Sundar et al., "ClassiPl: An Architecture for Fast and Flexible Packet Classification," IEEE, Mar./Apr. 2001, pp. 33-41.
Gupta, Pankaj et al., "Algorithms for Packet Classification," IEEE, Mar./Apr. 2001, pp. 24-32.
Lunteren, Jan van, "Searching Very Large Routing Tables in Wide Embedded Memory," IBM Research, Zurich Research Laboratory.

* cited by examiner

*Primary Examiner*—Phirin Sam
(74) *Attorney, Agent, or Firm*—Joscelyn G. Cockburn; Sawyer Law Group LLP

(57) ABSTRACT

A method and system for converting a plurality of ranges of values for a plurality of packet classification rules in a computer system is disclosed. The plurality of ranges exists in at least one dimension. The method and system include mapping each of the plurality of ranges to a plurality of nonoverlapping prefixes. The method and system also include mapping the plurality of nonoverlapping prefixes to a plurality of overlapping prefixes corresponding to the plurality of ranges. The plurality of overlapping prefixes include a plurality of shorter matching overlapping prefixes for a plurality of nonconflicting ranges.

16 Claims, 3 Drawing Sheets

METHOD AND SYSTEM FOR CONVERTING RANGES INTO OVERLAPPING PREFIXES FOR A LONGEST PREFIX MATCH

FIELD OF THE INVENTION

The present invention relates to computer systems, and more particularly to a method and system for converting ranges into overlapping prefixes for packet classification.

BACKGROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

FIG. 2 depicts a portion of a typical switch 50, which may be used for the switches 18 and 26 and/or a router (not shown). The switch 50 includes a network processor 52 and storage 54. The switch 50 typically also includes other components (not shown). The network processor 52 manages functions of the switch, including the classification of packets using the rules described below. The storage 54 retains data relating to the rules.

Referring to FIGS. 1 and 2, in order to manage communications in a network, such as the network 10 or 20, rules are used. Rules are typically employed by switches, routers and other portions of the network to perform packet classification. Each rule is used to classify packets which are being transmitted via a network in order to determine how the packet should be treated and what services should be performed. For example, a rule may be used in testing packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Such rules may also be used to transmit traffic based on the priorities of packets. For example, packets from a particular host, such as the host 12, may be transmitted because the packets have higher priority even when packets from the hosts 14 or 16 may be dropped. The rules may also be used to ensure that new sessions are not permitted to be started when congestion is high even though traffic from established sessions is transmitted. Other functions could be achieved based on the rule. The rules can also interact, based on the priority for the filter rule. For example, a first rule may be a default rule, which treats most cases. A second rule can be an exception the first rule. The second rule would typically have a higher priority than the first rule to ensure that where a packet matches both the first and the second rule, the second rule will control.

A key is tested in order to determine whether a particular rule will operate on a particular packet. The key that is typically used is the Internet Protocol (IP) header of the packet. The IP header typically contains five fields of interest: the source address, the destination address, the source port, the destination port and the protocol. These fields are typically thirty-two bits, thirty-two bits, sixteen bits, sixteen bits and eight bits, respectively. Rules typically operate on one or more of these fields. For example, based on the source and/or destination addresses, the rule may determine whether a packet from a particular host is allowed to reach a particular destination address.

Furthermore, the key often contains additional bits other than the fields of the IP header. For example, a TCP SYN (start of session) packet, which starts a session, may be characterized differently than a TCP packet for an existing session. This characterization is accomplished using bits in addition to those in the IP header. The additional bits may be used by a rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the rule utilizes a SYN packet or the additional bits which characterize a packet as a start packet or a packet from an existing session. Thus, the rules typically operate using a key that includes at least some fields of the IP header of a packet and may include additional bits.

In testing a key, it is determined whether to enforce a rule against a particular packet and thus classify the packet. The key is tested by determining whether certain fields for key of the packet exactly match range(s) of the rule. Each rule contains a range of values in one or more dimensions. Each dimension corresponds to a field of the key (typically the IP header). One type of rule has a range consisting of a single value. In such a case, the key would have to exactly match the value for the rule to operate on the packet. Other rules have ranges which can be expressed using a prefix. The prefix is a binary number containing a number of ones and zeroes (1 or 0) followed by wildcards (*). The lower bound of the range is obtained by replacing all of the wildcards by zeros. The upper bound of the range is determined by replacing all of the wildcards by a one). Other rules have arbitrary ranges. Arbitrary ranges are ranges that cannot be expressed using a single prefix. For example, one such range would be 00000000–10101001.

In performing packet classification, testing of keys for rules having ranges described by prefixes or a single value is well established. Typically, a conventional method for finding a longest prefix match is used. A longest prefix match for a key returns the longest prefix which matches the key. Such conventional methods are well established, relatively efficient and optimized. In addition, relatively little memory may be used for storing data relating to such rules because a prefix need only be stored. Moreover, testing of keys from packets against the prefixes is relatively fast. Consequently, However, one of ordinary skill in the art will readily recognize that conventional testing of keys against arbitrary ranges is significantly more time consuming. In addition, conventional methods for storing data describing the ranges may require a relatively large amount of memory. Consequently, conventional storage and testing of keys for rules having arbitrary ranges is relatively inefficient. Thus, classification of packets for rules having arbitrary ranges is typically difficult and time consuming. As a result, managing traffic for rules which have arbitrary ranges is problematic.

Accordingly, what is needed is an improved system and method for classifying packets using rules having arbitrary ranges. The present invention addresses such a need.

SUMMARY OF THE INVENTION

The present invention provides a method and system for converting a plurality of ranges of values for a plurality of packet classification rules in a computer system. The plurality of ranges exists in at least one dimension. The method and system comprise mapping each of the plurality of ranges to a plurality of nonoverlapping prefixes. The method and system also comprise mapping the plurality of nonoverlapping prefixes to a plurality of overlapping prefixes corresponding to the plurality of ranges. The plurality of overlapping prefixes include a plurality of shorter matching overlapping prefixes for a plurality of nonconflicting ranges.

According to the system and method disclosed herein, the present invention provides a method and system for mapping arbitrary ranges to a relatively small number of prefixes. Thus, testing and storage of data for the arbitrary ranges are facilitated.

DETAILED DESCRIPTION OF THE INVENTION

The present invention relates to an improvement in packet classification. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for converting a plurality of ranges of values for a plurality of packet classification rules in a computer system. The plurality of ranges exists in at least one dimension. The method and system comprise mapping each of the plurality of ranges to a plurality of nonoverlapping prefixes. The method and system also comprise mapping the plurality of nonoverlapping prefixes to a plurality of overlapping prefixes corresponding to the plurality of ranges. The plurality of overlapping prefixes include a plurality of shorter matching overlapping prefixes for a plurality of nonconflicting ranges.

The present invention will be described in terms of a particular set of rules utilizing certain ranges. However, one of ordinary skill in the art will readily recognize that this method and system will operate effectively for other rules using other ranges. One of ordinary skill in the art will also readily recognize that the method and system operate effectively for other systems using rules having ranges for other tasks. The present invention is also described in the context of rules having certain ranges. However, nothing prevents the application of the method and system to other rules and other types of ranges.

Figure 1:
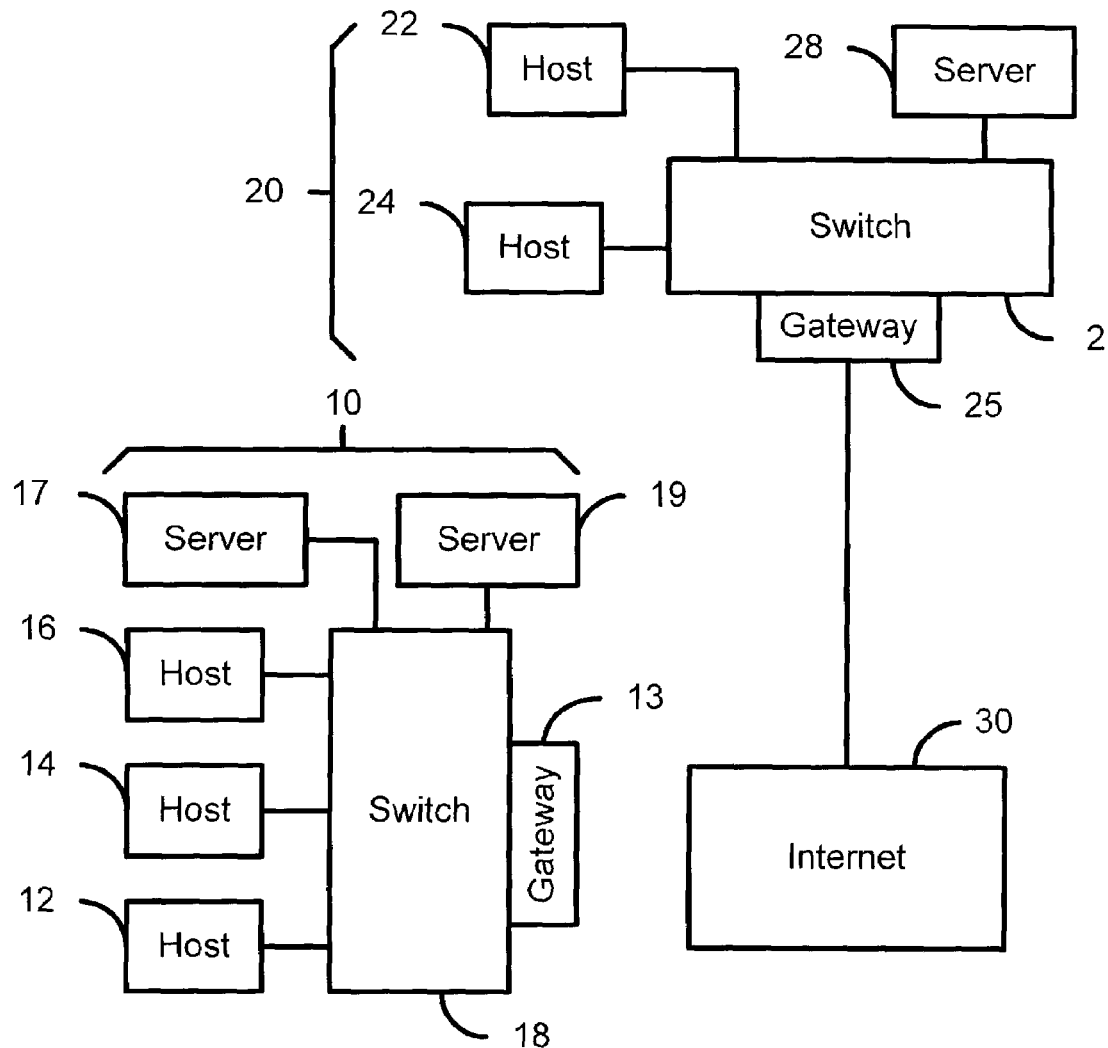
FIG. 1 is a diagram of computer systems of networks in which the present invention can be used.
Figure 2:
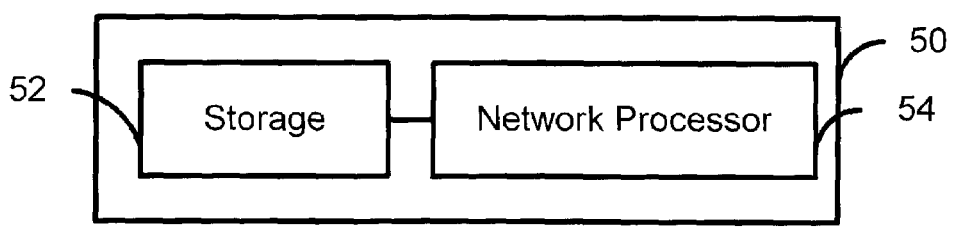
FIG. 2 is a diagram of a switch in which the present invention can be used.
Figures 3, 4:
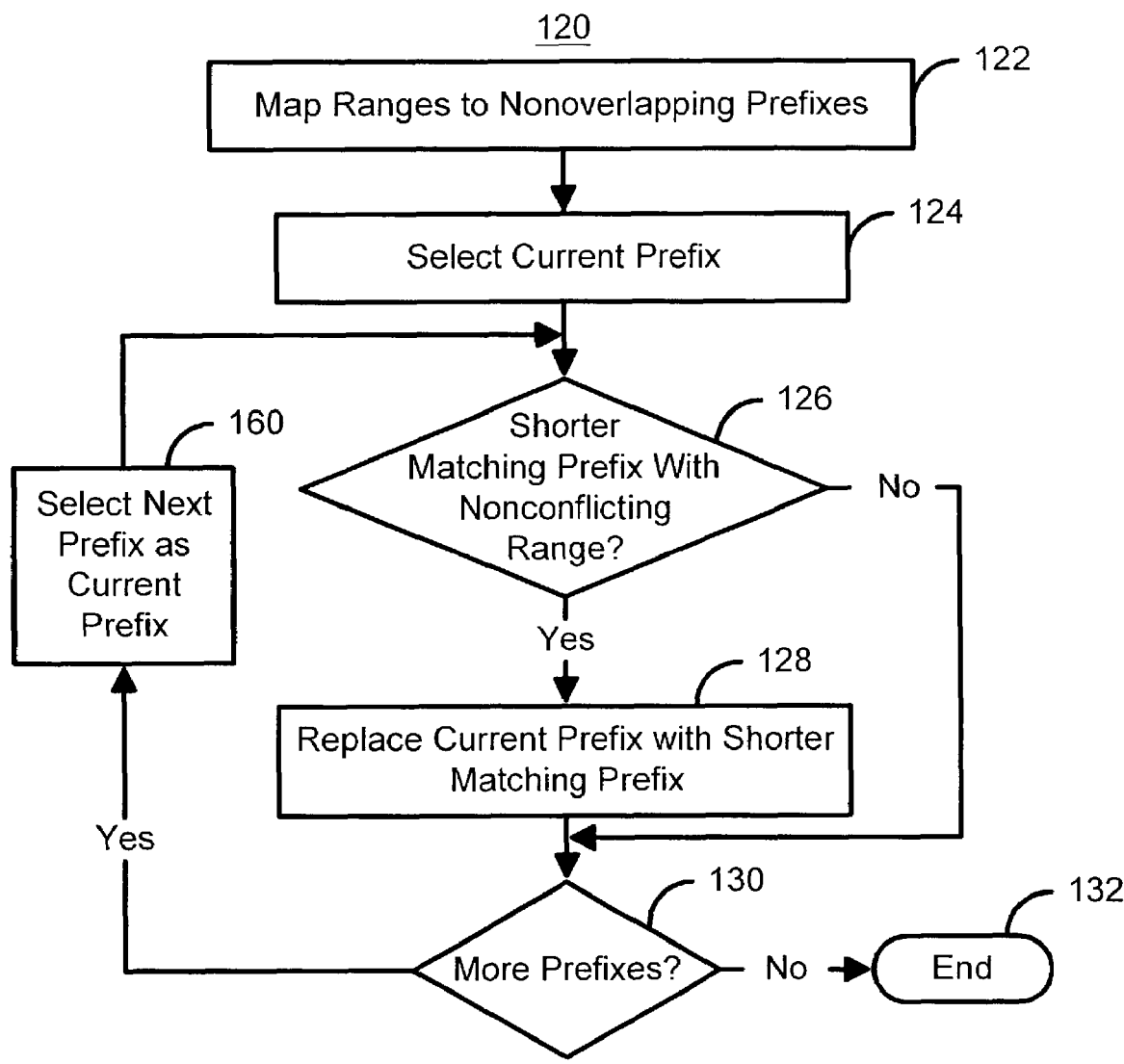
FIG. 3 is a high-level flow chart of one embodiment of a method for mapping arbitrary ranges of rules to overlapping ranges in accordance with the present invention.
FIG. 4 is a more detailed flow chart of one embodiment of a method mapping arbitrary ranges of rules to overlapping ranges in accordance with the present invention to allow longest prefix matches.

To more particularly illustrate the method and system in accordance with the present invention, refer now to FIG. 3, depicting a high-level flow chart of one embodiment of a method 100 for mapping arbitrary ranges of rules to overlapping ranges in accordance with the present invention. The method 100 is preferably used in the switch 50 or other routing tool and in the networks 10 and 20. However, the method 100 could be performed by other systems in which it is determined whether a particular key matches an arbitrary range. Thus, the method 100 is preferably performed using the network processor 52. The method 100 is performed for one or more rules, each of which has one or more ranges for a number of dimensions. Each dimension preferably corresponds to a particular field of the IP header. In addition, the ranges are arbitrary ranges. Thus, a particular range cannot be represented using a single nonoverlapping prefix.

The ranges are mapped to nonoverlapping prefixes, via step 102. Step 102 preferably includes mapping each range to a number of nonoverlapping prefixes. Because the ranges are arbitrary, each range requires multiple nonoverlapping prefixes. The nonoverlapping prefixes are mapped to a plurality of overlapping prefixes corresponding to the ranges of the rules, via step 104. The overlapping prefixes include shorter matching overlapping prefixes for a plurality of nonconflicting ranges. A shorter matching overlapping prefix is shorter than a nonoverlapping prefix to which it corresponds. The shorter matching overlapping prefix matches a portion of the corresponding nonoverlapping prefix. Preferably, the shorter matching overlapping prefix matches a number of the most significant bits of the corresponding nonoverlapping prefix. Having a nonconflicting range means that the shorter matching overlapping prefix does not match another prefix of the same length that corresponds to a different range than the range for the shorter matching overlapping prefix. In addition, the number of overlapping prefixes is typically significantly smaller than the number of nonoverlapping prefixes initially representing the ranges for the rules.

Because there are fewer overlapping prefixes, less storage is required. In addition, because the arbitrary ranges are represented by the overlapping prefixes, a longest prefix match can be performed to determine which range(s) a key for a particular packet might match. As a result, testing of keys for arbitrary ranges can be facilitated and made faster. In addition, storage of fewer overlapping prefixes can reduce the space occupied by information required for packet classification. Consequently, classification of packets using rules having arbitrary ranges is facilitated.

FIG. 4 is a more detailed flow chart of one embodiment of a method 120 for mapping arbitrary ranges of rules to overlapping ranges in accordance with the present invention to allow longest prefix matches. The method 120 is preferably used in the switch 50 or other routing tool and in the networks 10 and 20. However, the method 120 could be performed by other systems in which it is determined whether a particular key matches an arbitrary range. Thus, the method 120 is preferably performed using the network processor 52. The method 120 is performed for one or more rules, each of which has one or more ranges for a number of dimensions. Each dimension preferably corresponds to a particular field of the IP header. In addition, the ranges are arbitrary ranges. Thus, a particular range cannot be represented using a single nonoverlapping prefix.

For rules having arbitrary ranges, the (arbitrary) range(s) are mapped to nonoverlapping prefix(es), via step 122. Each of the arbitrary ranges typically requires multiple nonoverlapping prefixes in order for the range to be completely described. Thus, each nonoverlapping prefix corresponds to a particular range, and more than one nonoverlapping prefix corresponds to the same range. One of the nonoverlapping prefixes is selected as the current prefix, via step 124. The order in which the nonoverlapping prefixes are selected can vary. In a preferred embodiment, the nonoverlapping prefixes are selected in an order which reduces the number of overlapping prefixes provided in the method 120. Preferably, one of the longest nonoverlapping prefixes is selected in step 124. In one embodiment, the first nonoverlapping prefix selected also has a range corresponding to the largest total number of prefixes. In another embodiment, the first nonoverlapping prefix also has a range that has the longest continuous chain of overlapping prefixes from the longest prefix to a shorter prefix.

It is determined whether a shorter matching prefix corresponding to a nonconflicting range can be provided, via step 126. A shorter matching prefix is one that is shorter than and matches the remaining most significant digits of the current prefix. Such a prefix typically overlaps another prefix. A nonconflicting range is a range that is not different than the range of the current prefix. Thus, the shorter matching prefix already exists and corresponds to the same range as the current prefix or the shorter matching prefix can be formed by removing a number of the set digits of the current prefix. If the shorter matching prefix can be provided, the current prefix is removed and replaced with the shorter matching prefix, via step 128. Otherwise, step 128 is skipped.

It is determined whether there are other prefixes remaining to be processed, via step 130. If not, the method ends, via step 132. If so, the next remaining prefix is selected as the current prefix, via step 134. The next prefix is preferably selected based upon the length of the prefix and the number or prefixes corresponding to the same range, as discussed with respect to step 124. Thus, processing preferably continues from the longest prefix to the shortest prefix, based on the number or prefixes associated with the corresponding range. In a preferred embodiment, nonoverlapping prefixes that have been converted to shorter matching prefixes can be processed again (to even shorter matching prefixes) to further decrease their length. However, another mechanism for selecting the next nonoverlapping prefix can be used. Step 126 is then returned to. Mapping of the nonoverlapping prefixes to the overlapping prefixes, including shorter matching prefixes, is then continued.

For example, suppose that a set of rules includes three rules having arbitrary ranges. The ranges are each eight bits long and are Range 1 for Rule 1: 00000000–10101001; Range 2 for Rule 2: 10101010–11100000; Range 2 for Rule 3: 11100001–11111111. Thus, Range 1, Range 2 and Range 3 are arbitrary ranges. Using the method 100 and 120, the Ranges 1,2 and 3 are mapped to nonoverlapping prefixes. Thus, each range includes a number of nonoverlapping prefixes. The prefixes are:

| Range 1: | 0*** |
| | 100* |
| | 10100* |
| | 1010100* |
| Range 2: | 110* |
| | 1011* |
| | 101011* |
| | 1010101* |
| | 11100000 |
| Range 3: | 1111* |
| | 11101* |
| | 111001* |
| | 1110001* |
| | 11100001 |

The length of a prefix is given by the number of fixed digits in the prefix. Thus, Range 1 has prefixes of length 1, 3, 5 and 7. Range 2 has prefixes of length 3, 4, 6, 7 and 8. Range 3 has prefixes of length 4, 5, 6, 7 and 8. Note that Range 2 and Range 3 each have prefixes that are eight bits long, the same length as the range. Using the methods 100 and 120, these nonoverlapping prefixes are then mapped to overlapping prefixes which include shorter matching prefixes for nonconflicting ranges, using step 104 and steps 124–134, respectively. The first prefix is selected as the current prefix using the step 124. In order to do so, in a preferred embodiment, the prefixes are first ordered by length. Based on length, the prefixes are:

| Length 1 | 0* | Range 1 |
| Length 3 | 110* | Range 2 |
| | 100* | Range 1 |
| Length 4 | 1111* | Range 3 |
| | 1011* | Range 2 |
| Length 5 | 11101* | Range 3 |
| | 10100* | Range 1 |
| Length 6 | 111001* | Range 3 |
| | 101011* | Range 2 |
| Length 7 | 1110001* | Range 3 |
| | 1010101* | Range 2 |
| | 1010100* | Range 1 |
| Length 8 | 11100000 | Range 2 |
| | 11100001 | Range 3 |

One of the longest prefixes, having a length of 8, is then selected as the current prefix. In a preferred embodiment, the longest prefix having a range that has the largest number of prefixes is selected. Range 2, corresponding to prefix 11100000, has a total of five corresponding prefixes. Range 3, corresponding to prefix 11100001, has a total of five corresponding prefixes. Thus, in one embodiment, either prefix could be selected. However, Range 3 includes prefixes of length seven, six and five, while Range 2 includes prefixes of length seven and six. Thus, Range 3 has a longer chain of corresponding prefixes starting with the longest prefix. Thus, in this example, the prefix 1110001 for Range 3 is selected as the current prefix.

It is determined whether a shorter matching prefix for a nonconflicting range exists for the prefix 11100001 (the current prefix), as in step 126. This determination is made by removing the least significant bits of the current prefix as checking the other prefixes of that length. Thus, the prefix 11100001 becomes 1110000*, still corresponding to Range 3. There are no prefixes of length seven that are the same as 1110000* and which have a different (conflicting) range.

Thus, the prefix 11100001 can be replaced by the shorter matching prefix 1110000*. The prefixes are now:

| | | |
|---|---|---|
| Length 1 | 0* | Range 1 |
| Length 3 | 110* | Range 2 |
| | 100* | Range 1 |
| Length 4 | 1111* | Range 3 |
| | 1011* | Range 2 |
| Length 5 | 11101* | Range 3 |
| | 10100* | Range 1 |
| Length 6 | 111001* | Range 3 |
| | 101011* | Range 2 |
| Length 7 | 1110001* | Range 3 |
| | 1010101* | Range 2 |
| | 1010100* | Range 1 |
| | 1110000* | Range 3 |
| Length 8 | 11100000 | Range 2 |

Because there are more prefixes, the next prefix of length eight is selected as the current prefix. The prefix 11100000 for Range 2 is thus the current prefix. The prefix 11100000 is made one bit shorter, to 1110000*. However, there is a prefix that is the same and has a different (conflicting range), Range 3. Consequently, the prefix 11100000 cannot be shortened. The next prefix of length 7 is selected for processing. For example, the prefix 1110000* could be selected as the current prefix. The prefix 111000* is made one bit shorter to 111000*. Because there is no prefix that is the same and that has a conflicting range, the prefix 1110000* is replaced by the prefix 111000* for Range 3. This process continues until all of the prefixes have been processed. The final set of prefixes is:

| | | |
|---|---|---|
| Default Result | * | Range 2 |
| Length 1 | 0* | Range 1 |
| Length 3 | 100* | Range 1 |
| | 111* | Range 3 |
| Length 5 | 10100* | Range 1 |
| Length 7 | 1010100* | Range 1 |
| Length 8 | 11100000 | Range 2 |

Thus, the number of prefixes has been decreased greatly. In addition, several of the nonoverlapping prefixes have been replaced by shorter matching prefixes. Because there are fewer overlapping prefixes, less storage is required using the methods 100 and 120. In addition, because the arbitrary ranges are represented by the overlapping prefixes in the methods 100 and 120, a longest prefix match can be performed to determine which range(s) a key for a particular packet might match. As a result, testing of keys for arbitrary ranges can be facilitated and made faster. In addition, storage of fewer overlapping prefixes can reduce the space occupied by information required for packet classification. Consequently, classification of packets using rules having arbitrary ranges is facilitated.

Figure 5:
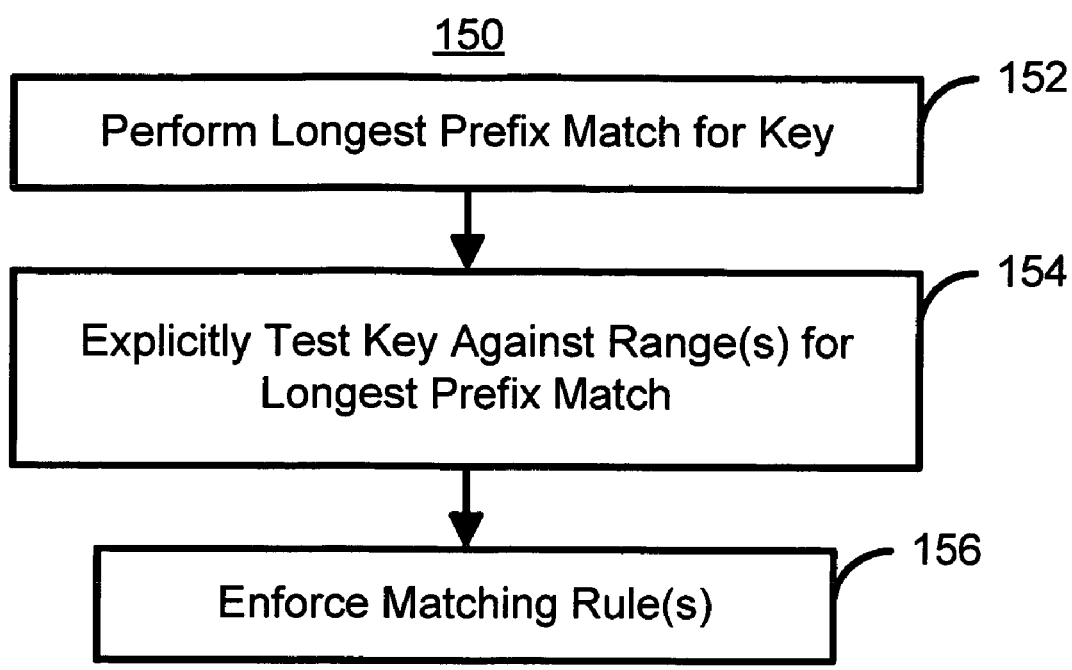
FIG. 5 is a high-level flow chart of one embodiment of a method in accordance with the present invention for using the overlapping, nonconflicting prefixes in packet classification.

FIG. 5 is a high-level flow chart of a method 150 in accordance with the present invention for using the overlapping prefixes in packet classification. The method 150 uses the overlapping prefixes obtained using the methods 100 and 120. Thus, the method 150 is performed when rules having arbitrary ranges are used in packet classification. A longest prefix match is performed for the key of a packet, via step 152. The key generally includes multiple fields. Thus, the longest prefix match may be performed for multiple ranges for different fields. Thus, the longest prefix of the overlapping prefixes that matches the key of the packet is determined. Step 152 preferably uses one or more of the many available longest prefix matches currently used in packet classification. However, the longest prefix match could be performed in another method. The key may then be explicitly tested to determine to which range, and thus which rule, the key corresponds, via step 154. The rule(s) are then enforced for the packet, via step 156. Thus, the actions dictated by the rules are performed in step 156.

Because the method 150 can use a longest prefix match search to determine to which range the packet corresponds, the method 150 can more rapidly find the rule(s) which should be enforced for the packet. Thus, the method 150 can perform packet classification more quickly even for rules having arbitrary ranges. Packet classification is thus made faster and more efficient.

A method and system has been disclosed for converting arbitrary ranges into overlapping prefixes to allow for a more efficient longest prefix match search to be used. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for converting a plurality of ranges of values for a plurality of packet classification rules in a computer system, the plurality of ranges in at least one dimension, the method comprising the steps of:
    (a) mapping each of the plurality of ranges to a plurality of nonoverlapping prefixes; and
    (b) mapping the plurality of nonoverlapping prefixes to a plurality of overlapping prefixes corresponding to the plurality of ranges, the plurality of overlapping prefixes including a plurality of shorter matching overlapping prefixes for a plurality of nonconflicting ranges.

2. The method of claim 1 wherein the nonoverlapping prefix mapping step (b) further includes the steps of:
    (b1) for a nonoverlapping prefix of the plurality of nonoverlapping prefixes, determining whether a shorter matching prefix for a nonconflicting range of the plurality of nonconflicting ranges exists; and
    (b2) replacing the nonoverlapping prefix with the shorter matching prefix.

3. The method of claim 2 wherein the nonoverlapping prefix mapping step (b) further includes the step of:
    (b3) repeating steps (b1) and (b2) for each of the plurality of nonoverlapping prefixes.

4. The method of claim 2 wherein the nonoverlapping prefix mapping step (b) further includes the step of:
    (b3) repeating steps (b1) and (b2) for each of the plurality of nonoverlapping prefixes in an order, the order based on a number of occurrences of a corresponding range for the prefix.

5. The method of claim 1 wherein each of the plurality of dimensions corresponds to a field of a plurality of fields in an IP address.

6. A computer-readable medium containing a computer program for converting a plurality of ranges of values for a plurality of packet classification rules in a computer system, the plurality of ranges in at least one dimension, the computer program including instructions for:

(a) mapping each of the plurality of ranges to a plurality of nonoverlapping prefixes; and (b) mapping the plurality of nonoverlapping prefixes to a plurality of overlapping prefixes corresponding to the plurality of ranges, the plurality of overlapping prefixes including a plurality of shorter matching overlapping prefixes for a plurality of nonconflicting ranges.

7. The computer-readable medium of claim 6 wherein the nonoverlapping prefix mapping instructions (b) further includes instructions for:

(b1) for a nonoverlapping prefix of the plurality of nonoverlapping prefixes, determining whether a shorter matching prefix for a nonconflicting range exists; and (b2) replacing the nonoverlapping prefix with the shorter matching prefix.

8. The computer-readable medium of claim 7 wherein the nonoverlapping prefix mapping instructions (b) further includes instructions for:

(b3) repeating steps (b1) and (b2) for each of the plurality of nonoverlapping prefixes.

9. The computer-readable medium of claim 7 wherein the nonoverlapping prefix mapping instructions (b) further includes instructions for:

(b3) repeating steps (b1) and (b2) for each of the plurality of nonoverlapping prefixes in an order, the order based on a number of occurrences of a corresponding range for the prefix.

10. The computer-readable medium of claim 6 wherein each of the plurality of dimensions corresponds to a field of a plurality of fields in an IP address.

11. A system for converting a plurality of ranges of values for a plurality of packet classification rules in a computer system, the plurality of ranges in at least one dimension, the system comprising:

a plurality of hosts for transmitting and receiving data;

means for mapping each of the plurality of ranges to a plurality of nonoverlapping prefixes; and means for mapping the plurality of nonoverlapping prefixes to a plurality of overlapping prefixes corresponding to the plurality of ranges, the plurality of overlapping prefixes including a plurality of shorter matching overlapping prefixes for a plurality of nonconflicting ranges.

12. The system of claim 11 wherein mapping means further includes:

means for determining whether a shorter matching prefix for a nonconflicting range exists for each of the plurality of nonoverlapping prefixes and means for replacing the each of the nonoverlapping prefix with the shorter matching prefix if the shorter matching prefix exists.

13. The system of claim 12 wherein the mapping means further includes:

means for determining whether a shorter matching prefix for a nonconflicting range exists for each of the plurality of nonoverlapping prefixes in an order and means for replacing the each of the nonoverlapping prefix with the shorter matching prefix if the shorter matching prefix exists, the order based on a number of occurrences of a corresponding range for the prefix.

14. The system of claim 11 wherein each of the plurality of dimensions corresponds to a field of a plurality of fields in an IP address.

15. A system for converting a plurality of ranges of values for a plurality of packet classification rules in a computer system, the plurality of ranges in at least one dimension, the system comprising:

a plurality of hosts for transmitting and receiving data;

a network processor for mapping the plurality of nonoverlapping prefixes to a plurality of overlapping prefixes corresponding to the plurality of ranges, the plurality of overlapping prefixes including a plurality of shorter matching overlapping prefixes for a plurality of nonconflicting ranges.

16. The system of claim 15 wherein the network process further for a nonoverlapping prefix of the plurality of nonoverlapping prefixes, determines whether a shorter matching prefix for a nonconflicting range exists and replacing the nonoverlapping prefix with the shorter matching prefix.

* * * * *